US008914838B2

(12) United States Patent
Okamura et al.

(10) Patent No.: US 8,914,838 B2
(45) Date of Patent: Dec. 16, 2014

(54) COMMUNICATION APPARATUS THAT SUPPRESSES INTERFERENCE OF COMMUNICATION SIGNAL OF COMMUNICATION APPARATUS USING A CABLE, AND METHOD AND PROGRAM FOR CONTROLLING THE SAME

(71) Applicant: NEC Magnus Communications, Ltd., Tokyo (JP)

(72) Inventors: Yuusaku Okamura, Tokyo (JP); Yasushi Hamada, Tokyo (JP); Yoshitaka Nakano, Tokyo (JP); Kazutoshi Ohishi, Tokyo (JP)

(73) Assignee: NEC Magnus Communications, Ltd., Tokyo (JP)

( * ) Notice: Subject to any disclaimer, the term of this patent is extended or adjusted under 35 U.S.C. 154(b) by 0 days.

(21) Appl. No.: 13/938,487

(22) Filed: Jul. 10, 2013

(65) Prior Publication Data
US 2014/0033263 A1   Jan. 30, 2014

(30) Foreign Application Priority Data

Jul. 25, 2012 (JP) .................................. 2012-164801

(51) Int. Cl.
| | | |
|---|---|---|
| H04N 7/173 | (2011.01) | |
| H04N 21/61 | (2011.01) | |
| H04N 7/10 | (2006.01) | |
| H04H 60/97 | (2008.01) | |
| H04B 17/00 | (2006.01) | |
| H04N 21/24 | (2011.01) | |
| H04L 12/66 | (2006.01) | |
| H04B 1/00 | (2006.01) | |

(52) U.S. Cl.
CPC .......... *H04N 21/6168* (2013.01); *H04N 7/102* (2013.01); *H04H 60/97* (2013.01); *H04B 17/005* (2013.01); *H04N 21/61* (2013.01); *H04N 21/2402* (2013.01)

USPC .......... 725/125; 725/111; 725/116; 725/117; 725/124; 370/463; 455/63.3

(58) Field of Classification Search
CPC ... H04N 7/17309; H04N 7/102; H04N 7/173; H04N 20/78; H04N 20/12; H04N 21/6168; H04H 60/97; H04H 20/26; H04H 20/62; H04L 12/2801; H04L 29/06; H04L 49/90; H04W 84/12; H04B 17/0057; H04B 17/005
USPC .......... 725/125, 124, 111, 117, 116; 370/463; 455/63.3
See application file for complete search history.

(56) References Cited

U.S. PATENT DOCUMENTS

| | | | | |
|---|---|---|---|---|
| 4,635,298 A | * | 1/1987 | Kage et al. ................... | 455/295 |
| 6,639,541 B1 | * | 10/2003 | Quintana et al. ............. | 342/18 |

(Continued)

FOREIGN PATENT DOCUMENTS

JP    2010-135972    6/2010

*Primary Examiner* — Hoang-Vu A Nguyen-Ba
(74) *Attorney, Agent, or Firm* — Young & Thompson (57) ABSTRACT

A communication apparatus comprises a reception unit that receives a reception signal from a metal cable and extracts reception data; a transmission unit that sends a transmission signal obtained by modulating transmission data with a frequency included in a first frequency band to the metal cable; an interference signal detection unit that detects a signal used in communication using a cable modem, modulated by a frequency included in a second frequency band, and transmitted over the metal cable as an interference signal; and a signal transmission control unit that instructs the transmission unit to modulate transmission data using a frequency included in a third frequency band that does not have any frequency band overlapping the second frequency band when the interference signal is detected and a frequency band overlapping both the first frequency band and the second frequency band exists.

15 Claims, 7 Drawing Sheets

(56) References Cited

U.S. PATENT DOCUMENTS

| | | | |
|---|---|---|---|
| 7,089,580 B1* | 8/2006 | Vogel et al. | 725/111 |
| 7,120,123 B1* | 10/2006 | Quigley et al. | 370/252 |
| 2002/0030874 A1* | 3/2002 | Heidemann et al. | 359/152 |
| 2002/0101883 A1* | 8/2002 | Ruszczyk et al. | 370/503 |
| 2006/0248567 A1* | 11/2006 | Vanderhoff et al. | 725/128 |
| 2008/0031185 A1* | 2/2008 | Bims | 370/328 |
| 2008/0146159 A1* | 6/2008 | Faltman et al. | 455/67.11 |
| 2011/0258678 A1* | 10/2011 | Cowling et al. | 725/125 |
| 2013/0229996 A1* | 9/2013 | Wang et al. | 370/329 |

* cited by examiner

COMMUNICATION APPARATUS THAT SUPPRESSES INTERFERENCE OF COMMUNICATION SIGNAL OF COMMUNICATION APPARATUS USING A CABLE, AND METHOD AND PROGRAM FOR CONTROLLING THE SAME

REFERENCE TO RELATED APPLICATION

This application is based upon and claims the benefit of the priority of Japanese patent application No. 2012-164801, filed on Jul. 25, 2012, the disclosure of which is incorporated herein in its entirety by reference thereto.

TECHNICAL FIELD

The present invention relates to a communication apparatus, and method and program for controlling the same, and particularly to a communication apparatus using a metal cable, and a method and program for controlling the same.

BACKGROUND

In recent years, the number of opportunities for a LAN (Local Area Network) to be configured in a single home has increased. In many cases, a LAN via Ethernet (registered trademark) cables is initially considered, however, it may be difficult to install new cables in a building constructed without keeping such an installation of cables in mind. This is because doors and stairs in the house become obstacles for the installation of new cables.

Meanwhile, wireless LAN is quite popular, however, wireless communication is susceptible to the surrounding environment and may not be able to achieve a sufficient communication speed, compared to wired communication. Under such circumstances, a LAN is often configured utilizing metal cables such as the telephone line already installed in the house or the coaxial cable used for receiving television broadcasts.

Patent Literature 1 discloses a communication apparatus that uses a coaxial cable as the transmission path of a signal. The communication apparatus disclosed by Patent Literature 1 suppresses the leakage of unnecessary radio waves from antennas by determining whether or not a coaxial cable used includes a broadcast signal and changing the signal level used in the communication when the coaxial cable includes a broadcast signal.
[Patent Literature 1]
Japanese Patent Kokai Publication No. JP2010-135972A

SUMMARY

Further, the disclosure of the prior art document is incorporated herein in its entirety by reference thereto. The following analysis is given by the present inventors.

As described above, when a LAN is configured in a home, metal cables such as coaxial cables are sometimes used. Meanwhile, it has become widely common for consumers to sign up with a service provider operating a cable television station to watch television programs. A consumer who has signed up for such a service uses coaxial cables installed in his home to receive a video signal transmitted by the cable television station. More concretely, the coaxial cables extending from the cable television station are distributed outside the homes of consumers and drawn into individual consumers' houses. Therefore, when a communication apparatus using a coaxial cable is used in the home of a consumer watching a television program from the video signal transmitted by the cable television station, a signal transmitted by the communication apparatus may leak outside the house and interfere with communication performed in the vicinity of the consumer.

Figure 7:
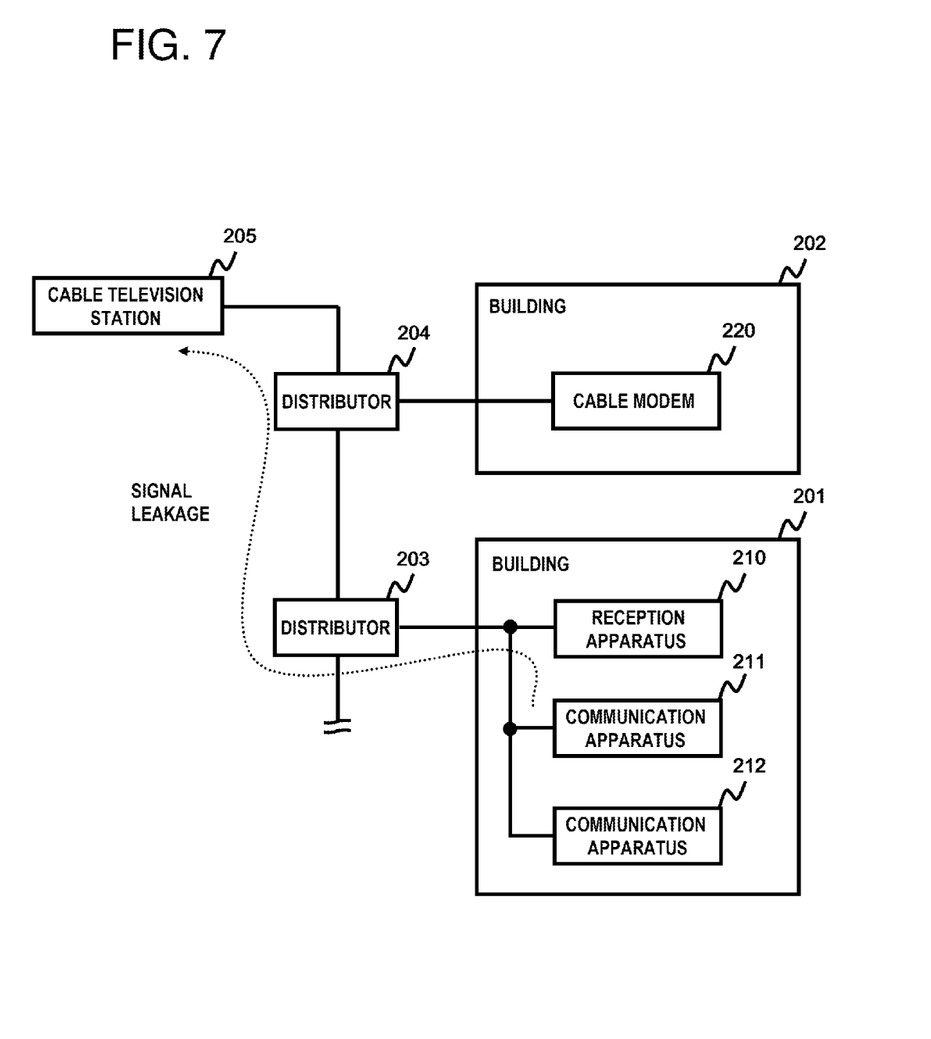
FIG. 7 is a drawing for explaining the effects of a communication apparatus using a coaxial cable.

FIG. 7 is a drawing for explaining the effects of a communication apparatus using a coaxial cable. In a building 201 in FIG. 7, a consumer watches a television program by receiving a video signal outputted by a cable television station 205 using a reception apparatus 210. Further, communication apparatuses 211 and 212 communicate with each other using a coaxial cable in the building 201. In a building 202, another consumer has signed a provider contract with the cable television station 205 and connects to a wide area network using a cable modem 220. In FIG. 7, coaxial cables installed in the buildings 201 and 202 are physically connected via distributors 203 and 204. Therefore, communication signals of the communication apparatuses 211 and 212 may leak from the distributor 203 and interfere with a communication signal between the cable television station 205 and the cable modem 220 (refer to a dotted line in FIG. 7).

Therefore, a communication apparatus, and a method and program for controlling the same that suppress the interference of a communication signal of the communication apparatus using a coaxial cable in a communication system using a cable modem is desired. Note that a signal detected in Patent Literature 1 is a broadcast signal of, for instance, satellite broadcasting. Since such a broadcast signal is broadcasted, one can easily obtain it with a broadcast signal reception apparatus and reliably detect it. Meanwhile, a signal of a cable modem connected in a neighbor's house is not broadcasted and is transmitted from the neighbor's house. Therefore, the technology of Patent Literature 1 that assumes the detection of broadcast signals cannot detect a cable modem signal transmitted from the neighbor's house.

According to a first aspect of the present invention, there is provided a communication apparatus comprising a reception unit that receives a reception signal from a metal cable and extracts reception data; a transmission unit that sends a transmission signal obtained by modulating transmission data with a frequency included in a first frequency band to the metal cable; an interference signal detection unit that detects a signal used in communication using a cable modem, modulated by a frequency included in a second frequency band, and transmitted over the metal cable as an interference signal; and a signal transmission control unit that instructs the transmission unit to modulate transmission data using a frequency included in a third frequency band that does not have any frequency band overlapping the second frequency band when the interference signal is detected and a frequency band overlapping both the first frequency band and the second frequency band exists.

According to a second aspect of the present invention, there is provided a method for controlling a communication apparatus comprising using a communication apparatus which comprises a reception unit that receives a reception signal from a metal cable and extracts reception data, and a transmission unit that sends a transmission signal obtained by modulating transmission data with a frequency included in a first frequency band to the metal cable; and the method further comprises detecting a signal used in communication using a cable modem, modulated by a frequency included in a second frequency band, and transmitted over the metal cable as an interference signal, and instructing the transmission unit to modulate transmission data using a frequency included in a third frequency band that does not have any frequency band overlapping the second frequency band when the interference signal is detected and a frequency band overlapping both the first frequency band and the second frequency band exists.

Further, the present method is tied to a particular machine, which is the communication apparatus comprising a reception unit that receives a reception signal from a metal cable and extracts reception data, and a transmission unit that sends a transmission signal obtained by modulating transmission data with a frequency included in a first frequency band to the metal cable.

According to a third aspect of the present invention, there is provided a program executed by a computer that controls a communication apparatus, wherein the program executes by using a communication apparatus which comprises a reception unit that receives a reception signal from a metal cable and extracts reception data, and a transmission unit that sends a transmission signal obtained by modulating transmission data with a frequency included in a first frequency band to the metal cable; and the program executes detecting a signal used in communication using a cable modem, modulated by a frequency included in a second frequency band, and transmitted over the metal cable as an interference signal, and instructing the transmission unit to modulate transmission data using a frequency included in a third frequency band that does not have any frequency band overlapping the second frequency band when the interference signal is detected and a frequency band overlapping both the first frequency band and the second frequency band exists.

Further, this program can be stored in a computer-readable storage medium. The storage medium may be a non-transient one such as a semiconductor memory, hard disk, magnetic storage medium, or optical storage medium. The present invention can also be realized as a computer program product.

The meritorious effects of the present disclosure include the following,

According to each aspect of the present invention, there is provided a communication apparatus, and a method and program for controlling the same that suppress the interference of a communication signal of the communication apparatus using a coaxial cable in a communication system using a cable modem.

PREFERRED MODES

First, a summary of an exemplary embodiment will be given using FIG. 1. Note that drawing reference signs used in the summary are given to elements as an example for convenience to facilitate understanding, and the description of the summary is not intended to limit the scope of the present invention in any way.

As described above, a communication apparatus that suppresses the interference of a communication signal of a communication apparatus using a coaxial cable in a communication system using a cable modem is desired.

Figure 1:
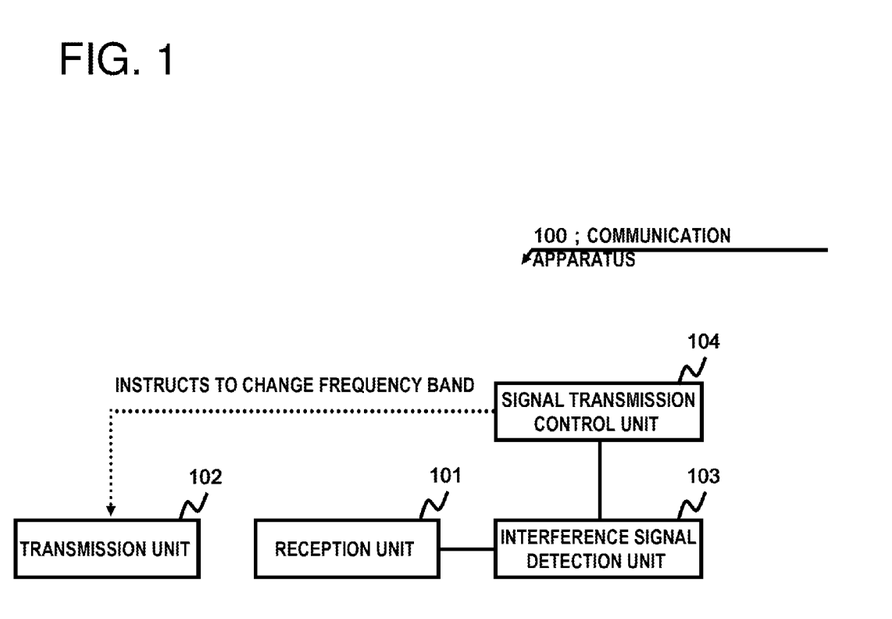
FIG. 1 is a drawing for explaining a summary of an exemplary embodiment.

As an example, a communication apparatus 100 shown in FIG. 1 is provided. The communication apparatus 100 comprises a reception unit 101, a transmission unit 102, an interference signal detection unit 103, and a signal transmission control unit 104. The reception unit 101 receives a reception signal from a metal cable and extracts reception data. The transmission unit 102 sends a transmission signal obtained by modulating transmission data with a frequency included in a first frequency band to the metal cable. The interference signal detection unit 103 detects a signal used in communication using a cable modem, modulated by a frequency included in a second frequency band, and transmitted over the metal cable as an interference signal. The signal transmission control unit 104 instructs the transmission unit 102 to modulate the transmission data using a frequency included in a third frequency band that does not have any frequency band overlapping the second frequency band when an interference signal is detected and a frequency band overlapping both the first frequency band and the second frequency band exists.

The communication apparatus 100 detects a signal used by a cable modem to communicate with a cable television station as an interference signal over a metal cable, and when an interference signal is present, the communication apparatus 100 communicates with other communication apparatuses while avoiding a frequency band used by the interference signal. As a result, even when cable modems are present in nearby houses in the vicinity of the communication apparatus 100, the communication apparatus 100 does not negatively affect these apparatuses. In other words, there can be provided a communication apparatus that suppresses the interference of a communication signal of the communication apparatus using a coaxial cable in a communication system using a cable modem. Note that the interference signal is a signal modulated by a predetermined frequency band when a cable modem realizes communication with a cable television station and detected on a metal cable.

Further, the following modes are possible.
[Mode 1]
The communication apparatus relating to the first aspect.
[Mode 2]
It is preferred that there be provided an interference signal notification unit that notifies a user of the presence of the interference signal in the metal cable when the interference signal is detected.
[Mode 3]
It is preferred that interference signal detection unit deem a signal transmitted by the cable modem to a cable television station to be a detection target as the interference signal.
[Mode 4]
It is preferred that the interference signal notification unit issue a notification that prompts a user to install a filter in the metal cable.
[Mode 5]
It is preferred that there be provided a control unit that instructs the transmission unit to suspend the transmission of the transmission signal, the interference signal detection unit detect the interference signal while the transmission of the transmission signal is suspended, and that the control unit have the transmission unit restart the transmission of the transmission signal when the interference signal is not detected during the suspension of the transmission of the transmission signal.

[Mode 6]

The communication apparatus control method relating to the second aspect.

[Mode 7]

It is preferred to include notifying a user of the presence of the interference signal in the metal cable when the interference signal is detected.

[Mode 8]

It is preferred, when notifying a user of the presence of said interference signal, a signal transmitted by the cable modem to a cable television station is deemed to be a detection target as the interference signal.

[Mode 9]

It is preferred, when notifying a user of the presence of said interference signal, to issue a notification that prompts a user to install a filter in the metal cable.

[Mode 10]

It is preferred to include instructing the transmission unit to suspend the transmission of the transmission signal and having the transmission unit restart the transmission of the transmission signal when the interference signal is not detected during the suspension of the transmission of the transmission signal.

[Mode 11]

The program relating to the third aspect.

[Mode 12]

It is preferred to execute notifying a user of the presence of the interference signal in the metal cable when the interference signal is detected.

[Mode 13]

It is preferred, when notifying a user of the presence of the interference signal, a signal transmitted by the cable modem to a cable television station is deemed to be a detection target as the interference signal.

[Mode 14]

It is preferred, when notifying a user of the presence of said interference signal, to execute issuing a notification that prompts a user to install a filter in the metal cable.

[Mode 15]

It is preferred to execute instructing the transmission unit to suspend the transmission of the transmission signal and having the transmission unit restart the transmission of the transmission signal when the interference signal is not detected during the suspension of the transmission of the transmission signal.

Concrete exemplary embodiments will be described further in detail with reference to the drawings.

Exemplary Embodiment 1

A first exemplary embodiment will be described in detail using the drawing.

Figure 2:
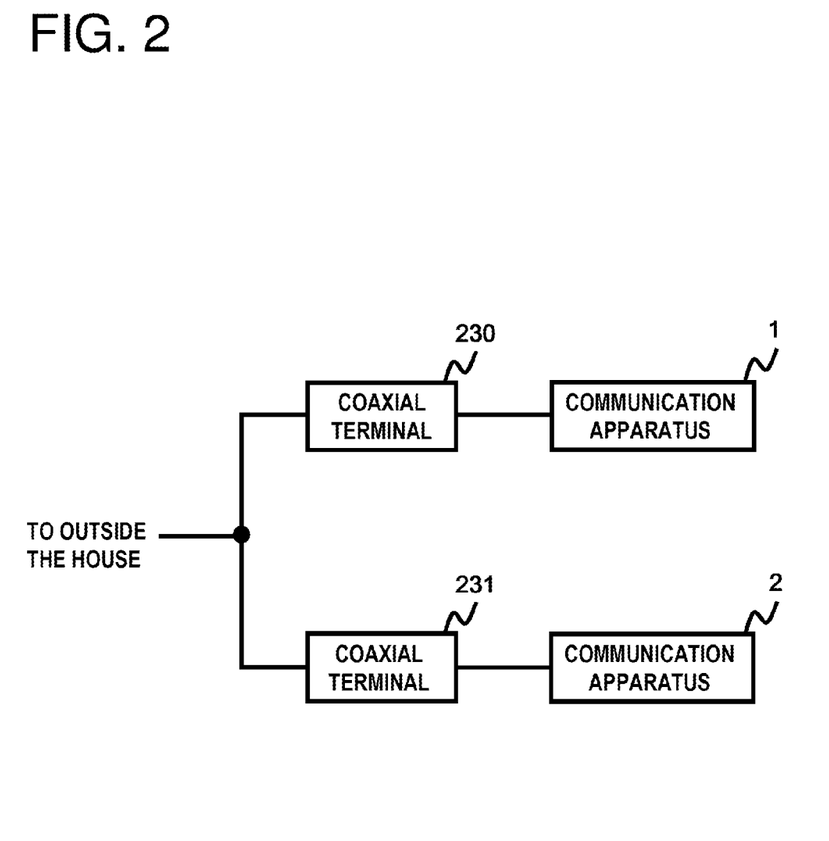
FIG. 2 is a drawing illustrating an example of a network system including a communication apparatus 1 relating to a first exemplary embodiment.

FIG. 2 is a drawing illustrating an example of a network system that includes a communication apparatus 1 relating to the present exemplary embodiment.

FIG. 2 includes two communication apparatuses (1 and 2) and these communication apparatuses 1 and 2 constitute a LAN. The communication apparatuses 1 and 2 are connected to each other via coaxial terminals 230 and 231 and coaxial cables (metal cables). The communication apparatuses 1 and 2 are multicarrier communication apparatuses capable of transmitting/receiving data by switching between a plurality of frequencies. Further, the communication apparatus 2 is configured and operates identically to the communication apparatus 1. Therefore, only the communication apparatus 1 will be described below.

Figure 3:
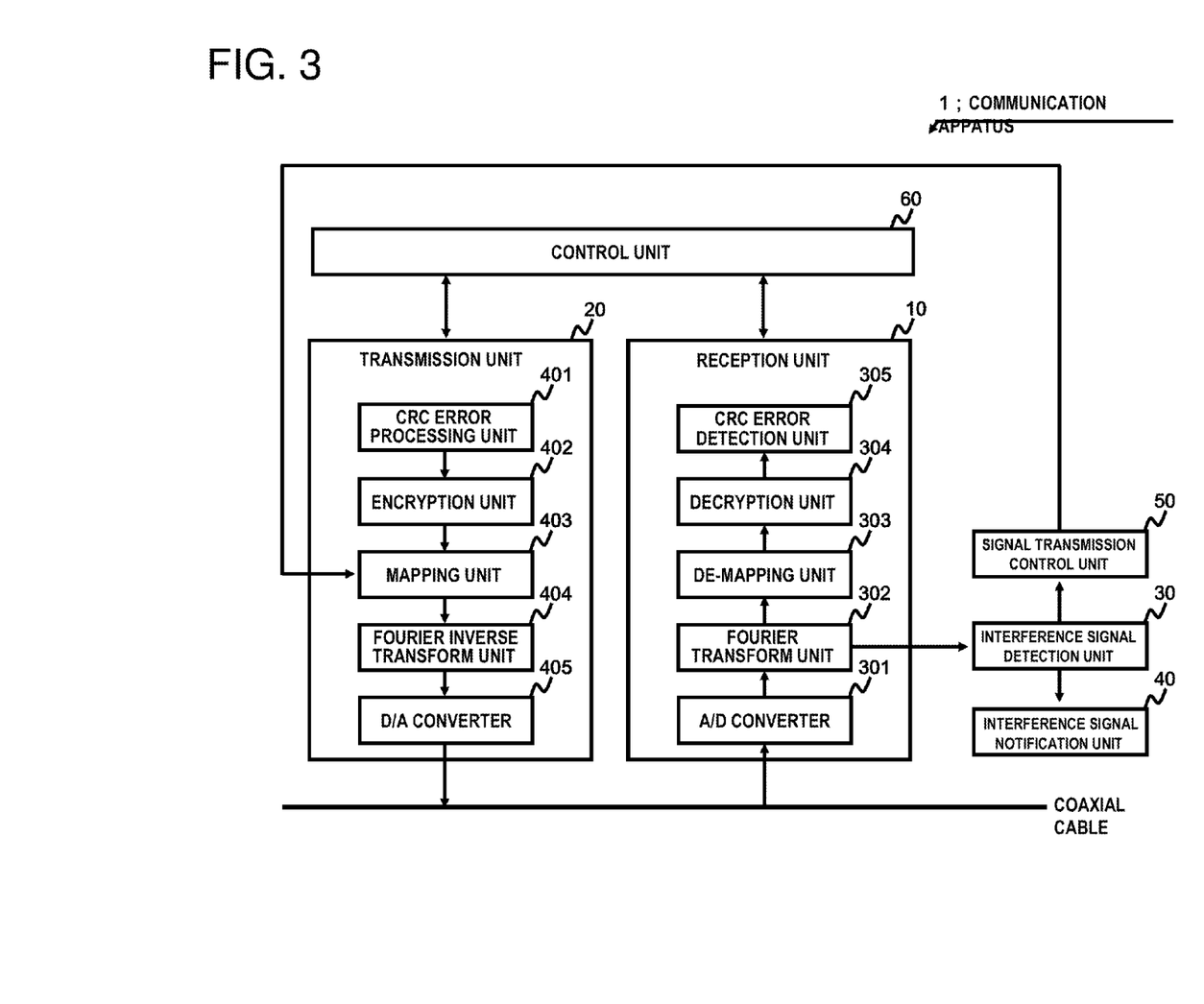
FIG. 3 is a drawing illustrating an example of the internal configuration of the communication apparatus 1.

FIG. 3 is a drawing illustrating an example of the internal configuration of the communication apparatus 1. Note that FIG. 3 only shows modules relating to the communication apparatus 1 relating to the present exemplary embodiment for the sake of simplicity.

The communication apparatus 1 includes a reception unit 10, a transmission unit 20, an interference signal detection unit 30, an interference signal notification unit 40, a signal transmission control unit 50, and a control unit 60.

The communication apparatus 1 realizes communication via the coaxial cable by using the reception unit 10 and the transmission unit 20.

The interference signal detection unit 30 receives a signal separated for each frequency from the reception unit 10. The interference signal detection unit 30 detects whether or not the frequencies of the reception frequency sequence include a signal (i.e., interference signal) with which the communication performed by the communication apparatus 1 affects other communications. The interference signal detection unit 30 outputs the detection results to the interference signal notification unit 40 and the signal transmission control unit 50.

When the interference signal detection unit 30 detects an interference signal, the interference signal notification unit 40 notifies the user of the communication apparatus 1 of this fact. The interference signal notification unit 40 may notify the user with light using a light-emitting diode or with a sound such as a warning sound or alarm.

The signal transmission control unit 50 instructs the transmission unit 20 to change the frequency used for modulation.

The control unit 60 controls the entire communication apparatus 1. Further, the control unit 60 receives data from the reception unit 10 and performs information processing based on the reception data. Further, the control unit 60 generates the results of the information processing as transmission data and transmits the data to other communication apparatuses via the transmission unit 20. Note that the interference signal detection unit 30, the interference signal notification unit 40, the signal transmission control unit 50, and the control unit 60 can be realized by a computer program that has a computer built into the communication apparatus 1 execute each processing described later using the hardware thereof.

The reception unit 10 receives a signal transmitted by another communication apparatus (for instance, the communication apparatus 2) from the coaxial cable and extracts it as reception data. The reception unit 10 includes an A/D (Analog to Digital) conversion unit 301, a Fourier transform unit 302, a de-mapping unit 303, a decryption unit 304, and a CRC (Cyclic Redundancy Checking) error detection unit 305.

The A/D conversion unit 301 acquires an analog signal in the coaxial cable and converts it into a digital signal.

The Fourier transform unit 302 performs a Fourier transform on the digital signal outputted by the A/D conversion unit 301. As a result, the digital signal is divided into signals of different frequencies.

The de-mapping unit 303 de-maps the signals outputted by the Fourier transform unit 302 to signals compatible with a communication protocol used by the communication apparatus 1.

The decryption unit 304 decrypts an encryption applied to the reception signal. Further, the decryption unit 304 performs error correction using an FEC (Forward Error Correction) code given to the de-mapped signals.

The CRC error detection unit 305 confirms a CRC outputted by the decryption unit 304 and detects whether or not normal communication has been performed. A signal determined to be normal communication is transmitted to the control unit 60 as the reception data.

The transmission unit 20 modulates the transmission data using a predetermined frequency and sends the result to the coaxial cable as a transmission signal. The transmission unit 20 includes a CRC error processing unit 401, an encryption unit 402, a mapping unit 403, a Fourier inverse transform unit 404, and a D/A (Digital to Analog) conversion unit 405.

The CRC error processing unit 401 assigns a CRC code to the transmission data on which the control unit 60 has performed information processing.

The encryption unit 402 encrypts a signal outputted by the CRC error processing unit 401. At this time, the encryption unit 402 also assigns a FEC code.

The mapping unit 403 maps a signal outputted by the encryption unit 402 to a signal transmitted to the coaxial cable. Further, the mapping unit 403 decides on a frequency (frequency band) modulating the transmission data based on the instruction from the signal transmission control unit 50. Further, the mapping unit 403 notifies the Fourier inverse transform unit 404 of the frequency modulating the transmission data.

The Fourier inverse transform unit 404 modulates a signal outputted by the mapping unit 403, converting it into a transmission signal.

The D/A conversion unit 405 converts the transmission signal, which is a digital signal, into an analog signal and sends the converted signal to the coaxial cable.

Next, the operation of the communication apparatus 1 will be described.

Before starting communication using the coaxial cable, the communication apparatus 1 detects whether or not a ranging signal transmitted by a cable modem is present in the coaxial cable. The ranging signal transmitted by a cable modem is a signal for establishing and maintaining a link between a cable television station and the cable modem.

Figure 4A:
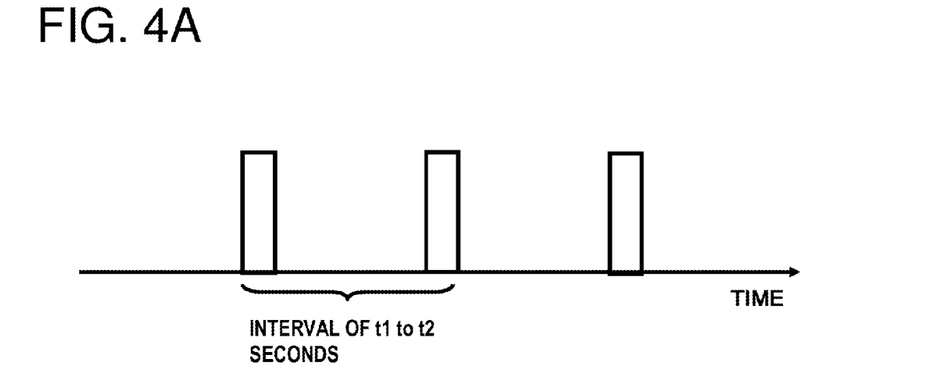
FIGS. 4A and 4B are drawings for explaining a ranging signal transmitted by a cable modem.
Figure 4B:
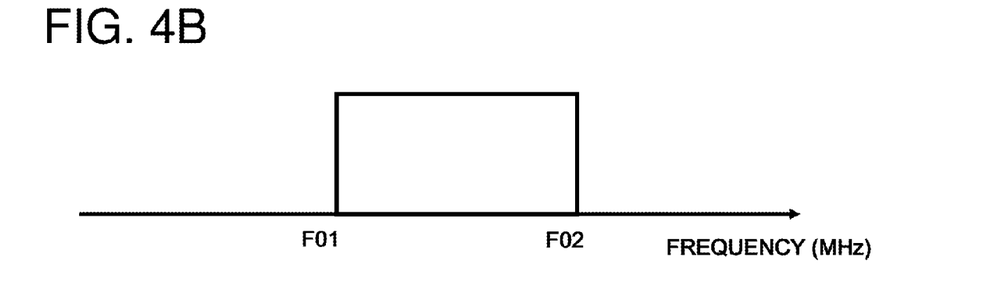

The service provider operating the cable television station determines the specifications of the ranging signal. For instance, the provider determines the specifications such that a signal having a bandwidth of B01 to B02 MHz in a frequency band of F01 to F02 MHz (refer to FIG. 4A) is transmitted at an interval of t1 to t2 seconds (refer to FIG. 4B). Further, the cable modem transmits the ranging signal during a period in which it does not transmit/receive substantial data to/from the cable television station.

When detecting a ranging signal transmitted by a cable modem in the coaxial cable, the communication apparatus 1 determines that a cable modem is present in a house nearby and does not perform any communication using a frequency included in a frequency band used by the ranging signal.

Further, when grasping the presence of a ranging signal in the coaxial cable, the communication apparatus 1 notifies the user of the fact that a cable modem is present in a house nearby, using the interference signal notification unit 40. Having received the notification, the user installs filters in a distributor (for instance the distributor 203 in FIG. 7) present between the cable television station and his own building. Or the interference signal notification unit 40 may output a display or sound that directly prompts the user to install filters.

When detecting a ranging signal, the communication apparatus 1 performs communication while avoiding the frequency band used by the ranging signal. More concretely, when a ranging signal using the frequency band F01 to F02 MHz is detected, the transmission data is not modulated using any frequency included in the frequency band F01 to F02 MHz.

Further, the communication apparatus 1 regularly looks for a ranging signal, and if no ranging signal is detected, the communication apparatus 1 performs communication using the frequency band in which the communication apparatus 1 has looked for a ranging signal (F01 to F02 MHz). Further, when no ranging signal is detected in the coaxial cable due to the fact that the user has inserted a filter, the communication apparatus 1 may determine that an impact on the communication performed by a cable modem is low and start communication using the frequency band used by the ranging signal.

Figure 5:
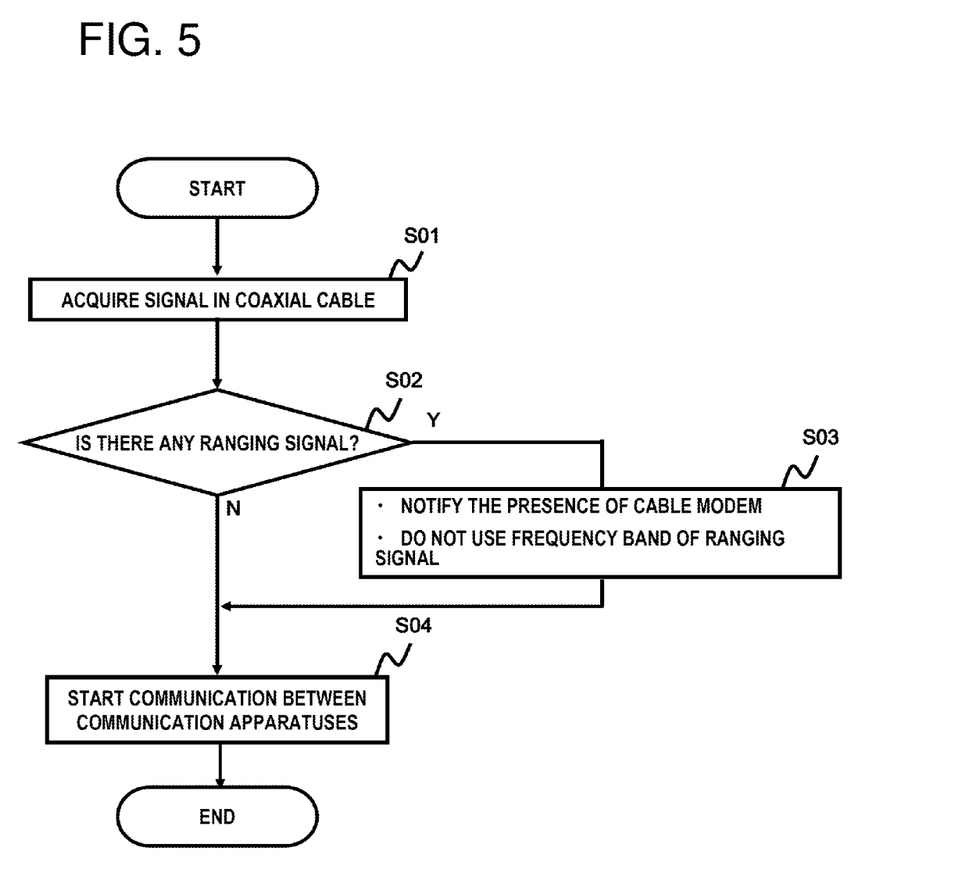
FIG. 5 is a flowchart illustrating an operation example of the communication apparatus 1.

FIG. 5 is a flowchart illustrating an operation example of the communication apparatus 1.

In step S01, before starting to communicate with another communication apparatus (for instance, the communication apparatus 2), the reception unit 10 acquires a signal in the coaxial cable for a predetermined period of time. When a ranging signal is present in the acquired signal (Yes in step S02), the interference signal notification unit 40 notifies the user of the presence of a cable modem in the vicinity (step S03). Having received the notification, the user installs a filter in an appropriate location. Meanwhile, the signal transmission control unit 50 instructs the transmission unit 20 not to use a frequency band used by the ranging signal (step S03).

When no ranging signal is present in the acquired signal (No in the step S02), the communication apparatus 1 starts communicating with another communication apparatus. The communication apparatus 1 starts communication with another communication apparatus as described above.

Next, the operation of the communication apparatus 1 during a communication operation will be described.

Figure 6:
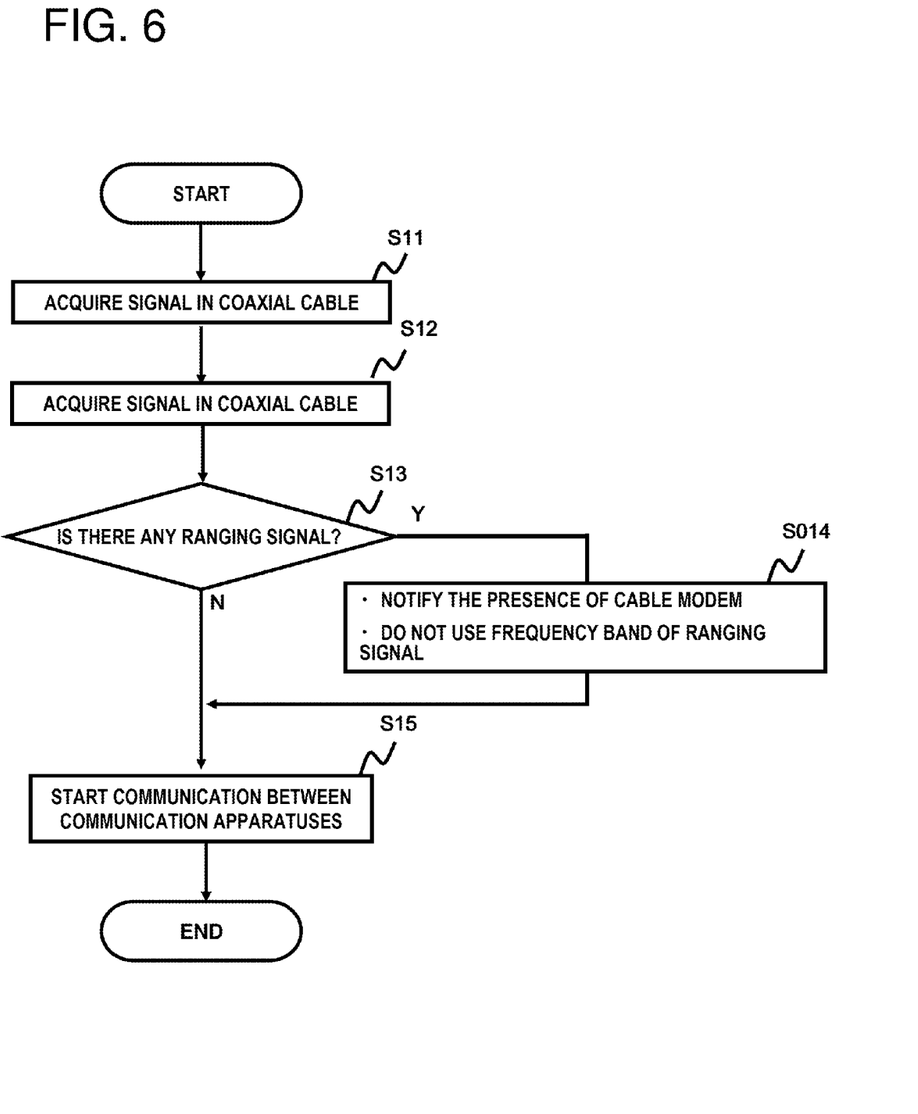
FIG. 6 is a flowchart illustrating an operation example of the communication apparatus 1 during a communication operation.

FIG. 6 is a flowchart illustrating an operation example of the communication apparatus 1 during a communication operation.

Using the control unit 60, the communication apparatus 1 in the communication operation instructs the transmission unit 20 to suspend the communication on a regular basis (step S11). Then, the interference signal detection unit 30 detects the presence of a ranging signal (steps S12 and S13). When no ranging signal is present in the coaxial cable, the control unit 60 instructs the transmission unit 20 to restart the communication (step S15). When an interference signal is present, this fact is notified to the user, and overlapping of used frequency bands is avoided (steps S14).

Since each service provider operating a cable television station uses a different frequency band or bandwidth, it is preferable to sequentially confirm the presence of a ranging signal defined by each provider in the coaxial cable.

The communication apparatus 1 can be realized as a modem connected to a PC (Personal Computer) and having the PC join a LAN. The communication apparatus 1 can also be realized as a PC with a network card supporting communication using a coaxial cable.

As described, the communication apparatus 1 relating to the present exemplary embodiment detects the presence of a ranging signal in a coaxial cable. When a ranging signal is present in the coaxial cable, the communication apparatus 1 communicates with another communication apparatus while avoiding the frequency band used by the ranging signal.

Further, since the communication apparatus 1 detects the presence of an interference signal on a regular basis, even when a cable modem that did not initially exist is installed in the vicinity, the communication apparatus 1 grasps the presence of such a cable modem and eliminates overlapping of used frequency bands.

The communication apparatus 1 relating to the present exemplary embodiment detects a ranging signal transmitted by a cable modem as an interference signal by utilizing the fact that the communication apparatus 1 is connected to the cable modem via a distributor outside the house (for instance the distributors 203 and 204 in FIG. 7). Since a ranging signal is a signal leaking from the house in which the cable modem is present, it may be attenuated considerably. However, the communication apparatus 1 specializes in detecting ranging signals (detecting particular bandwidths in particular frequency bands in particular transmission intervals); therefore, it is capable of detecting an attenuated ranging signal.

The disclosure of the aforementioned Patent Literature is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

What is claimed is:

1. A communication apparatus, comprising:
   a reception unit that receives a reception signal from a metal cable and extracts reception data;
   a transmission unit that sends a transmission signal obtained by modulating transmission data with a frequency included in a first frequency band to said metal cable;
   an interference signal detection unit that detects a signal used in communication using a cable modem, modulated by a frequency included in a second frequency band, and transmitted over said metal cable as an interference signal;
   an interference signal notification unit that notifies a user of the presence of said interference signal in said metal cable when said interference signal is detected; and
   a signal transmission control unit that instructs said transmission unit to modulate transmission data using a frequency included in a third frequency band that does not have any frequency band overlapping said second frequency band when said interference signal is detected and a frequency band overlapping both said first frequency band and said second frequency band exists.

2. The communication apparatus according to claim 1, wherein said interference signal detection unit deems a signal transmitted by said cable modem to a cable television station to be a detection target as said interference signal.

3. The communication apparatus according to claim 2, wherein said interference signal notification unit issues a notification that prompts a user to install a filter in said metal cable.

4. The communication apparatus according to claim 1, wherein said interference signal notification unit issues a notification that prompts a user to install a filter in said metal cable.

5. The communication apparatus according to claim 1, further comprising:
   a control unit that instructs said transmission unit to suspend the transmission of said transmission signal, wherein
   said interference signal detection unit detects said interference signal while the transmission of said transmission signal is suspended, and
   said control unit has said transmission unit restart the transmission of said transmission signal when said interference signal is not detected during the suspension of the transmission of said transmission signal.

6. A method for controlling a communication apparatus, comprising:
   using a communication apparatus which comprises:
      a reception unit that receives a reception signal from a metal cable and extracts reception data; and
      a transmission unit that sends a transmission signal obtained by modulating transmission data with a frequency included in a first frequency band to said metal cable,
   said method further comprising:
      detecting a signal used in communication using a cable modem, modulated by a frequency included in a second frequency band, and transmitted over said metal cable as an interference signal;
      notifying a user of the presence of said interference signal in said metal cable when said interference signal is detected; and
      instructing said transmission unit to modulate transmission data using a frequency included in a third frequency band that does not have any frequency band overlapping said second frequency band when said interference signal is detected and a frequency band overlapping both said first frequency band and said second frequency band exists.

7. The method for controlling a communication apparatus according to claim 6, wherein when notifying a user of the presence of said interference signal, a signal transmitted by said cable modem to a cable television station is deemed to be a detection target as said interference signal.

8. The method for controlling a communication apparatus according to claim 7, wherein when notifying a user of the presence of said interference signal, a notification is issued that prompts a user to install a filter in said metal cable.

9. The method for controlling a communication apparatus according to claim 6, wherein when notifying a user of the presence of said interference signal, a notification is issued that prompts a user to install a filter in said metal cable.

10. The method for controlling a communication apparatus according to claim 6, further comprising:
    instructing said transmission unit to suspend the transmission of said transmission signal; and
    restarting, by the transmission unit, the transmission of said transmission signal when said interference signal is not detected during the suspension of the transmission of said transmission signal.

11. A non-transitory computer readable medium containing a program executed by a computer that controls a communication apparatus, the program executing a method using a communication apparatus including a reception unit that receives a reception signal from a metal cable and extracts reception data, and a transmission unit that sends a transmission signal obtained by modulating transmission data with a frequency included in a first frequency band to said metal cable, the method comprising:

detecting a signal used in communication using a cable modem, modulated by a frequency included in a second frequency band, and transmitted over said metal cable as an interference signal;

notifying a user of the presence of said interference signal in the metal cable when said interference signal is detected; and instructing said transmission unit to modulate transmission data using a frequency included in a third frequency band that does not have any frequency band overlapping said second frequency band when said interference signal is detected and a frequency band overlapping both said first frequency band and said second frequency band exists.

12. The medium according to claim 11, wherein when notifying a user of the presence of said interference signal, a signal transmitted by the cable modem to a cable television station is deemed to be a detection target as said interference signal.

13. The medium according to claim 12, wherein the method further comprises, when notifying a user of the presence of said interference signal, issuing a notification that prompts a user to install a filter in the metal cable.

14. The medium according to claim 11, wherein the method further comprises, when notifying a user of the presence of said interference signal, issuing a notification that prompts a user to install a filter in the metal cable.

15. The medium according to claim 11, the method further comprising:

instructing said transmission unit to suspend the transmission of said transmission signal; and having said transmission unit restart the transmission of said transmission signal when said interference signal is not detected during the suspension of the transmission of said transmission signal.

* * * * *